Feb. 18, 1941. E. K. BENEDEK 2,232,430
WELDED HOUSING STRUCTURE FOR HYDRAULIC MACHINES
Filed April 28, 1937 2 Sheets-Sheet 1
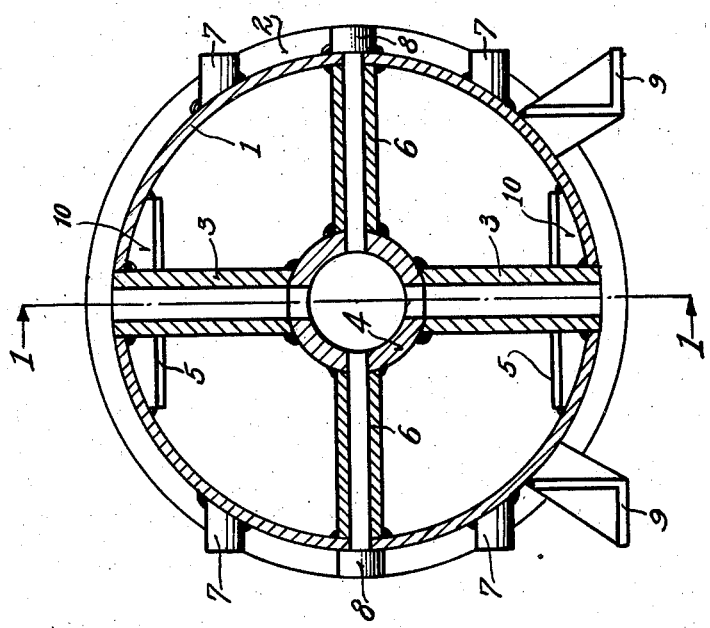
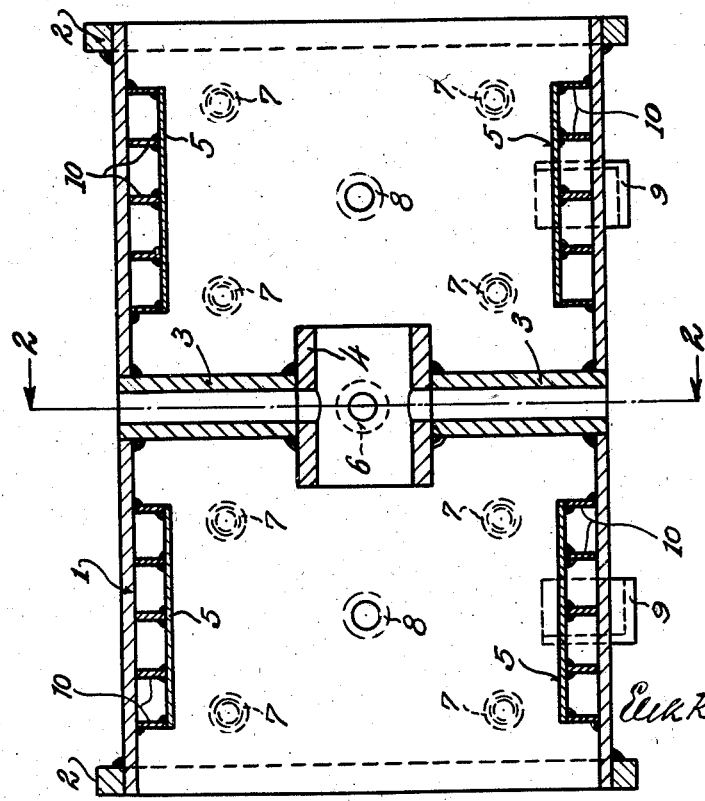
Inventor
Erik K. Benedek

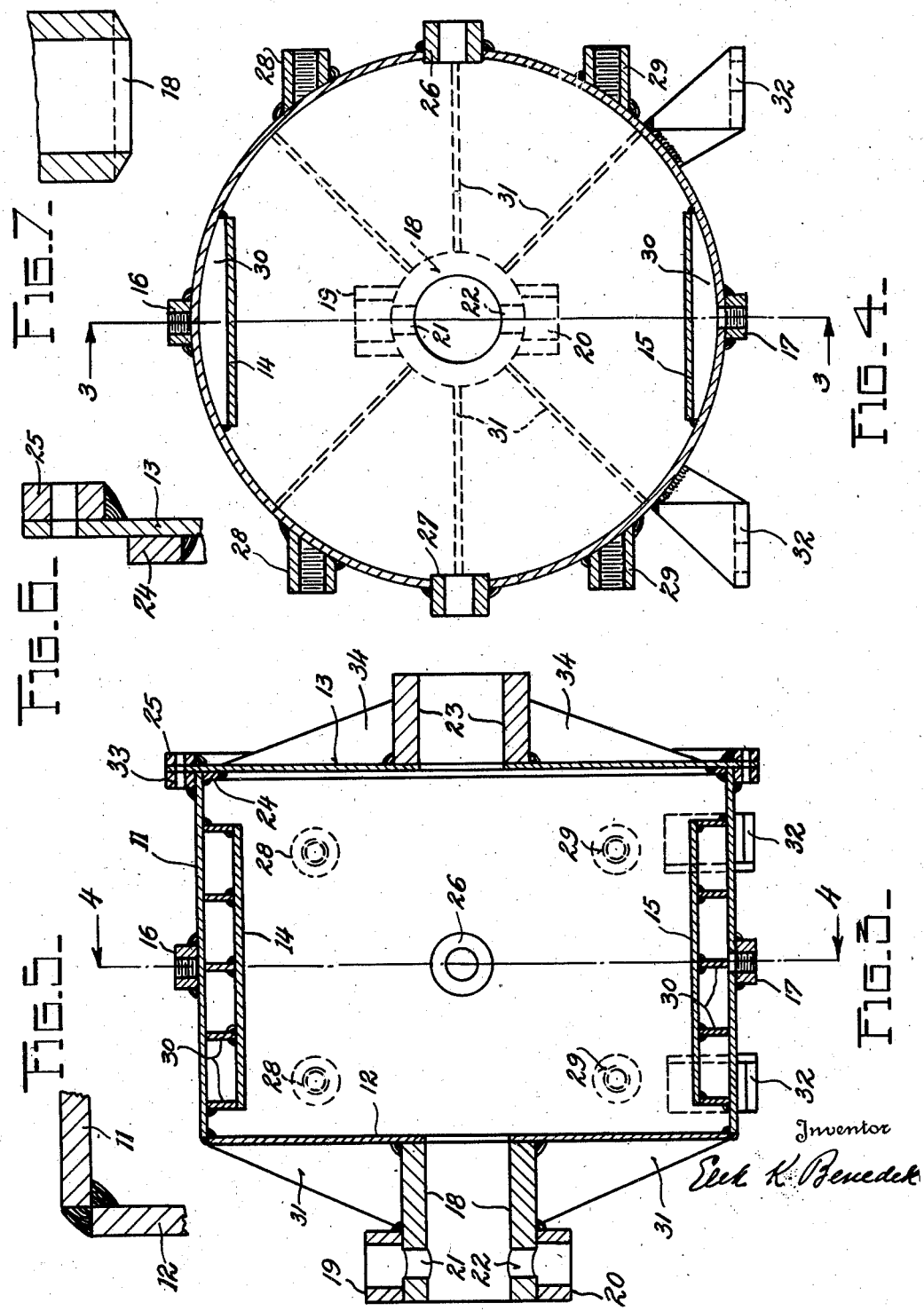

Patented Feb. 18, 1941

2,232,430

UNITED STATES PATENT OFFICE 2,232,430

WELDED HOUSING STRUCTURE FOR HYDRAULIC MACHINES

Elek K. Benedek, Bucyrus, Ohio

Application April 23, 1937, Serial No. 139,412

16 Claims. (Cl. 60—53)

This invention relates to welded housing structures, for heavy duty fluid pressure machines, such as high pressure variable delivery pumps and motors or combined pump and hydraulic motor assemblies, known in the art as complete hydraulic power transmission mechanisms, and which require unusually rigid housing structures, with attributes suitable for heavy load and hydraulic pressure functions.

Ordinary high grade castings used heretofore, are too heavy, too expensive, and in many instances cannot be cleaned properly. The castings contain fluid passages which cannot be cleaned properly. In the passages of such cast housings, however, the foreign matter gradually becomes loose, and gets into the working fluid, causing wear, and scoring, and finally resulting in the destruction of the hydraulic close fits of the pistons and cylinders, valve pintle and the like.

An object of the invention is to overcome the difficulties inherent in the cast housing structures of the prior art by providing a housing structure weld-fabricated from sheet metal parts.

Another object is to provide weight economy. In aeronautics, aircraft, automotive and many other industrial applications, navy, etc., it is imperative that the net weight of a machine, developing certain horsepower, be less than, or equal to, a certain number of pounds per horsepower.

For instance, in an aircraft power plant a variable speed propeller drive through a complete hydraulic power transmission is very desirable. To control the load of the driving engine becomes a matter of safety. The control of the speed of the propeller, in a suitable manner, would eliminate the change of the working pitches of the blades which are inefficient at constant speed. These desirable applications of variable speed hydraulic drives all depend on low weight. If the addition of a hydraulic variable speed transmission in weight is overbalanced by advantages obtained, then the drive is acceptable, and becomes a useful part of the power plant. According to my knowledge, such application and acceptance of a hydraulic power transmission today depends entirely on a favorable horsepower per weight ratio of the transmission system. Today this ratio approaches unity.

One object of the present invention is to increase the utility of such transmission devices, for instance by providing a lighter and yet stronger load carrying housing structure. In the accompanying drawings illustrating welded housing structures, I show light, yet very rigid reinforced welded structures, made of refined commercial cold-rolled sheet metal plates, seamless tubing or the like.

Fig. 1 is a longitudinal sectional view of a housing, constructed in accordance with this invention, taken through line 1—1 in Fig. 2.

Fig. 2 is a transverse sectional view, taken on line 2—2 in Fig. 1.

Fig. 3 is a longitudinal section of a modified form of housing for a pump or motor taken on line 3—3 in Fig. 4.

Fig. 4 is a transverse sectional view, taken on line 4—4 in Fig. 3.

Fig. 5 is an enlarged fragmentary sectional view of Fig. 1 showing one of the left hand corner connections, formed by the end plate and the coacting cylindrical body portion of the housing.

Fig. 6 is an enlarged fragmentary sectional view of Fig. 1 showing the right hand removable end plate, and the manner in which the removable flange is welded to the end plate itself.

Fig. 7 is a fragmentary sectional view of tubular member, which is used to make a structural welded connection with respective welded portions of the housing by a welding process.

The inner working mechanism of pumps or motors and transmission structures of this type of housing may be such as is shown in my Patent No. 2,159,245, entitled "Variable displacement pump or motor" and issued on May 23, 1939, or my Patent No. 2,163,079, entitled "Hydraulic transmission" and issued on June 20, 1939.

Referring to the drawings, each housing 1 (Figures 1 and 2) and 11 (Figures 2 and 3) comprises a cylindrical sheet-metal member as at 1 and 11 respectively. The housing shown in Fig. 1 comprises two distinct compartments, but it will be seen that it is the combination of two such housings as is shown in Fig. 3.

A pair of diametrally opposite bearing plain faced surfaces 5—5 and 14 and 15 is mounted on a plurality of segmental sheet metal elements such as shown at 10 and 30 respectively. Each segmental element 10 or 30 is welded to its respective bearing plate 5 or 15 to support collectively the bearing plate. Heavy shock load, resulting from the hydraulic piston load of the several radial piston and cylinder assemblies, necessitates rigid bearing support.

It will be seen that each bearing plate 5, 14, or 15, when welded to a plurality of segmental elements such as 10 or 30, will form an independent support member, made up of a plurality of independent sheet metal elements by a welding process. However, as soon as the welded members are welded in the housings 1 or 11 in pairs and in diametrally opposite fixed positions, they will be fixed portions with respect to the housing itself.

The transmission housing of Fig. 1 utilizes two pairs of such welded bearing supports as at 5—5, while the pump or motor housing of Fig. 3 utilizes only one pair of welded pads, such as shown at 14 and 15 respectively.

For reenforcing the housings and for providing for attachment of end closure plates or covers, the ends of the housings are provided with flanges as shown at 2—2 in Figures 1 and 2 and at 33 in Figure 3. One removable cover plate 13 is shown in Figure 3 for closing one end of the housing 11, the other end thereof being closed by an end plate 12 welded in place. The end plate 12 may, however, be replaced by a removable cover plate, such as the cover plate 13. Similar removable cover plates may be used to close the two ends of the housing shown in Figure 1.

The circular edge of plate 12 is welded to the cylindrical end of the housing as shown in Fig. 5. The axially, as well as radially aligned members, are then clamped and welded all around the edges in a conventional welding machine. The drawings indicate the welding at certain points only, and do not carry it all around for the sake of simplicity of the drawings. It will be seen, that by utilizing a pad structure such as shown at 5 or 30, in combination with a cylindrical main casing, such as 1 or 11, an important advantage is obtained. Each element, 10 or 30, is segmental and fits exactly the inner cylindrical surface of the housing. It will be seen that they can be arranged parallel to each other and then welded to the housing by the use of appropriate fixtures so as to obtain the desired accuracy of supports. This is a difficult task in machining a casting where the pads are inside of the casting and are difficult to reach and to set up for a precision machining. In the present instance, however, all the machining is made on the sub-assembly and independently of the casing, or of the other parts. In addition, the sub-assemblies 5 and 15 are adjustable inside the casing during the assembly. After the proper adjustment, the adjusted parts are clamped and the welding completed, and the assembling of the final structure can be proceeded with.

The segmental elements 10 and 30 will distribute the hydraulic pressure of the bearing plates 14 and 15 to a large area on the housing.

A valve pintle supporting tubular member 18 is welded to one of the end plates as shown in Fig. 3. In order to reinforce it and distribute the load of the valve pintle throughout the entire area of the endplate 12, a plurality of evenly distributed plate members such as shown at 31 are utilized for securing the pintle support 18 to the end plate 12 of the housing 11. Plate members 31 will also conduct heat away from the housing.

Member 18 is provided with the necessary inlet and outlet ports 21 and 22, which lead to the necessary main pump connections for the external oil circuit of the pump. The main external pump connections shown at 19 and 20 are welded to the valve support member 18.

In the housing shown in Figure 1, tubular members 3—3 serve both to carry the pintle support 4 and to provide for fluid communication with the interior thereof. The member 4 corresponds to the pintle support 18 in Fig. 3. In this instance, however, I utilize cross support tubular members 6—6, which are welded to member 4 and to the housing just as members 3—3 are welded together with the pintle support 4.

It will be noted that the passage in one member 3 will be the inlet passage of the transmission, while the passage in the other member 3 will be the discharge passage. Discharge in a transmission occurs through a relief valve only, and therefore, in the passage of one of the members 3, a high pressure relief valve will be seated.

The passage in members 6—6 will be utilized for either supercharging, or for a pressure gauge or indicator connection, or both.

Since my above-referred-to patents show variable delivery pump and variable speed motor units, a manual, or hydraulic control, is necessary to shift the internal reactance ring of the machine, which is shiftably mounted on pads 5—5 or 14 and 15, respectively. It is necessary to connect the shifter ring to outside control means by appropriate shifter rods. These rods will project through openings 8—8 in Fig. 1, or through openings 26 and 27 in Fig. 3. In addition to the openings, guiding means are also necessary for the shifter rods, consequently tubular pieces, 26 and 27, or 8—8, are used, welded to the housing in diametrally opposite positions and extending in the direction of the shifting of the reactance member. It therefore follows that the axis of tubing elements, 26 and 27, or 8—8, will be parallel to the bearing surfaces 5—5, or 14—15 respectively.

Drain connections are also necessary on the housing, as at 17 in Fig. 3 and Fig. 4, and lifting connection means for eye-bolts, as at 16.

The external control means, mechanical or hydraulic, will be bolted to tapped bosses 28—29 in Fig. 3 and Fig. 4, or to welded bosses 7—7 in Fig. 1 and Fig. 2.

The bosses are also made of tubular separate pieces and are welded to the housing. Since they will be tapped and drilled, it is obvious that the hollow sections will reduce weight and the time necessary for drill and tapping operations.

Where the co-acting surfaces of associated members are such that their inclosed angle is greater than 90 degrees, it will be advantageous to chamfer the welded end of any tubular number in order to provide greater welding surface for the weld on the tube. Such chamfered end is shown in Fig. 7, ready for welding.

For the other end of the valve pintle, a weight and load supporting element is also provided, as shown at 23 in Fig. 3. Such tubular welded piece, first is welded to the end plate, 13, and then it is reinforced by web plates, 34, so that the load imposed on the bearing 23 will be evenly distributed all over the end plate 13, and further, it will be transmitted to the end flange 33 by means of coupling bolts, fixing each end plate 13 to the housing 11. Suitable legs, such as at 9 and 32, also are welded to the housing for mounting purposes.

It will be seen that the welding structure, by permitting the use of hollow sections, or tubings, and thin sheet metal plates in reinforced welded combination, will greatly reduce the overall weight of the housing without sacrificing its rigidity or strength. This is possible because the inertia moment is kept great enough for the applied load in spite of the reduced material and weight of the structure. Dead weight in certain applications is prohibitive, and in others it reduces the pay-load capacity of the machine.

It is obvious that the welded and reinforced structure hereinabove specifically described may be made by any suitable material, such as "duralumin", or light magnesium alloys, which are much lighter than steel, and which further reduce weight. The structural improvement shown here is not limited to the use of any particular material since the purpose of the improvement is to provide, by the novel arrangements, a light structure, which does not depend, for lightness, upon the use of certain special and expensive metals having inherently low specific weights.

Various changes may be made in the embodiment of this invention hereinabove specifically described without departing from it, as defined in the appended claims.

I claim:

1. In a welded sheet metal housing, the combination of a cylindrical body portion, diametrally opposite plain faced bearing means rigidly secured inside of said body portion, end plates for said cylindrical body portion, one for each end thereof, and cylindrical bearing means carried by said end plates and having their axis in the same line and coincident with the longitudinal axis of said body portion, and projecting toward opposite directions from one another, said plain faced bearing means including a bearing plate connected along a pair of opposed spaced edges thereof to said body portion, whereby the bearing plate is rigidly supported on and within the body portion, and the body portion is reenforced by the bearing plate.

2. In a welded, sheet metal housing, the combination of a cylindrical body portion, diametrally opposite flat bearing members inside of said body portion parallel to the axis thereof, and webs lying between and welded to each of said bearing members and the adjacent side of said body portion.

3. In a welded, sheet metal housing, the combination of a cylindrical body portion, diametrally opposite plain faced bearing means rigidly secured inside of said body portion; end plates for said cylindrical body portion, one for each end thereof; and cylindrical bearing means carried by said end plates and having their axis in the same line and coincident with the longitudinal axis of said body portion, and projecting toward opposite directions from one another; said plain faced bearing means including a plurality of parallelly spaced segmental plates and a bearing plate; said segmental plates having a straight chordal edge and a circular edge portion; said circular edge portion extending over said chordal straight portion; said chordal straight portions being in supported abutment with one face of said plain faced bearing means, and said circular edges being in supported abuttment with the casing respectively.

4. In a welded, sheet metal housing, the combination of a cylindrical body portion, diametrally opposite plain faced bearing means rigidly secured inside of said body portion; end plates for said cylindrical body portion, one for each end thereof; cylindrical bearing means carried by said end plates, and having their axis in the same line and coincident with the longitudinal axis of said body portion, and projecting toward opposite directions from one another, and a plurality of tubular means secured externally to said body portion, said tubular means including a pair of diametrally opposite and open ended tubing elements disposed on a diameter in the midnormal plane of said plain faced bearing means and parallel therewith, and similar closed ended elements disposed about said open ended elements at each half section of the said body portion.

5. In a welded, sheet metal housing, the combination of a cylindrical body portion, diametrally opposite plain faced bearing means rigidly secured inside of said body portion; end plates for said cylindrical body portion, one for each end thereof; cylindrical bearing means carried by said end plates and having their axis in the same line and coincident with the longitudinal axis of said body portion, and projecting toward opposite directions from one another, said plain faced bearing means including a bearing plate connected along a pair of opposed spaced edges thereof to said body portion whereby the bearing plate is rigidly supported on and within the body portion and the body portion is reenforced by the bearing plate, and a plurality of radially disposed plate elements to support said cylindrical bearing means on said end plates uniformly and irrespective of the direction of load applied to said cylindrical bearing means.

6. In a welded, sheet metal housing, the combination of a cylindrical body portion, diametrally opposite flat bearing means rigidly secured inside of said body portion, end plates for the two ends of said cylindrical body portion, outwardly projecting cylindrical bearing means carried by said end plates and having their axis in line with the longitudinal axis of said body portion, fluid passage means carried by said cylindrical bearing means, and gussets welded to said bearing means and to said end plates.

7. In a welded, sheet metal housing structure the combination of a body structure, a pair of parallel and diametrally opposite plain faced bearing means inside of said body structure, and a plurality of supporting elements disposed between said body structure and said bearing means, each such bearing means including a bearing plate and a plurality of supporting elements disposed between the body structure and bearing plate and connecting the plate to the body structure along a pair of opposed spaced edges of the plate whereby to distribute the bearing load of said bearing means on diametrally opposite sides and on substantially large areas of the body to thereby create substantially equalized load transmission between said bearing means and said body, and means to support and reinforce the ends of said body.

8. In a welded, sheet metal housing structure the combination of a body structure, a pair of parallel and diametrally opposite plain faced bearing means inside of said body structure; a plurality of supporting elements disposed between said body structure and said bearing means to distribute the bearing load of said bearing means on diametrally opposite sides and on substantially large areas of the body to thereby create substantially equalized load transmission between said bearing means and said body, and means to support and reinforce the ends of said body; said supporting elements comprising segmental sheet metal pieces having a circular portion and a straight chordal portion to snugly fit the associated bearing means and the supporting cylindrical body portion respectively, and each element being disposed in a plane normal to the axis of the body structure.

9. In a welded housing structure in combination, a cylindrical straight body portion having reinforced circular open ends; a cross-like reinforcing member disposed substantially at midway between the ends of the housing and substantially normal to the longitudinal axis of the housing; plain faced bearing means disposed at each side of said cross-like member, inside of the housing, and in pairs in diametrally opposite positions and parallel with one leg of said cross-like member, and means to close the ends of said body structure.

10. In a welded housing structure in combination, a cylindrical straight body portion having reinforced circular open ends; a cross-like reinforcing member disposed substantially at midway between the ends of the housing and substantially normal to the longitudinal axis of the housing; plain faced bearing means disposed at each side of said cross-like member, inside of the housing, and in pairs in diametrally opposite positions and parallel with one leg of said cross-like member, and means to close the ends of said body structure; said cross-like member comprising a tubular and axially disposed hub portion and a plurality of radially extending tubular members, said hub-portion, and tubular cross-like members being welded together to form a reinforced combination for bearing and conduit means in said housing.

11. In a welded housing structure in combination, a cylindrical straight body portion having reinforced circular open ends; a cross-like reinforcing member disposed substantially at midway between the ends of the housing and substantially normal to the longitudinal axis of the housing; plain faced bearing means disposed at each side of said cross-like member, inside of the housing, in pairs in diametrally opposite positions, and parallel with one leg of said cross-like member, and means to close the ends of said body structure; said cross-like member including a central axial tubular element disposed substantially in the axis of the body, and a plurality of radially disposed tubular legs welded to the housing.

12. In a welded housing structure in combination, a cylindrical straight body portion having reinforced circular open ends; a cross-like reinforcing member disposed substantially at midway between the ends of the housing and substantially normal to the longitudinal axis of the housing; plain faced bearing means disposed at each side of said cross-like member, inside of the housing, in pairs in diametrally opposite positions, and parallel with one leg of said cross-like member, and means to close the ends of said body structure; said plain faced bearing means including a load transmitting welded bearing structure comprising a sheet metal bearing element and a plurality of segmental elements welded to said sheet metal bearing element and to the housing structure respectively, to transmit and distribute the load of said sheet metal bearing element to said housing on a substantially large area.

13. In a welded housing structure in combination, a cylindrical straight body portion having reinforced circular open ends; a cross-like reinforcing member disposed substantially at midway between the ends of the housing and substantially normal to the longitudinal axis of the housing; plain faced bearing means disposed at each side of said cross-like member, inside of the housing, in pairs in diametrally opposite positions, and parallel with one leg of said cross-like member, and means to close the ends of said body structure; said plain faced bearing means including a load transmitting welded bearing structure comprising a sheet metal bearing element and a plurality of segmental elements welded to said sheet metal bearing element and to the housing structure respectively, to transmit and distribute the load of said sheet metal bearing element to said housing on a substantially large area; said segmental elements comprising straight and circular edges respectively, and disposed parallel between each other and substantially normal to their respective supporting bearing elements.

14. In a welded housing structure in combination, a cylindrical straight body portion having reinforced circular open ends; a cross-like reinforcing member disposed substantially at midway between the ends of the housing and substantially normal to the longitudinal axis of the housing; plain faced bearing means disposed at each side of said cross-like member, inside of the housing, and in pairs in diametrally opposite positions and parallel with one leg of said cross-like member, and means to close the ends of said body structure, and external means secured to said housing structure; one set of such means being provided for each half of said housing structure; said external means comprising welded tubular sections, the axes of said sections being parallel to each other, and in a plane normal to the longitudinal axis of said housing.

15. In a welded, sheet metal housing, the combination of a cylindrical body portion; and a reinforcing structure disposed within the body portion intermediate the ends thereof, said reinforcing structure comprising a tubular hub portion whose axis extends longitudinally of said body portion, the hub portion being formed with a plurality of radially directed fluid passage openings, and a plurality of tubular supporting members connected at their outer ends to said body portion and at their inner ends being connected to said hub portion, the openings in said tubular supporting members registering respectively with the passage openings in said hub portion.

16. In a welded, sheet metal housing, the combination of a cylindrical body portion; and a reinforcing structure disposed within the body portion intermediate the ends thereof, said reinforcing structure comprising a tubular hub portion whose axis extends longitudinally of said body portion, the hub portion being formed with a plurality of pairs of diametrically opposite, radially directed fluid passage openings, and a plurality of pairs of diametrically opposite, tubular supporting members connected at their outer ends to said body portion and at their inner ends being connected to said hub portion, the openings in said tubular supporting members registering respectively with the passage openings in said hub portion.

ELEK K. BENEDEK.